June 10, 1958     H. A. DINTER     2,837,924
MOUNTING MEANS FOR ANGULAR PICKOFFS
Filed Nov. 8, 1954
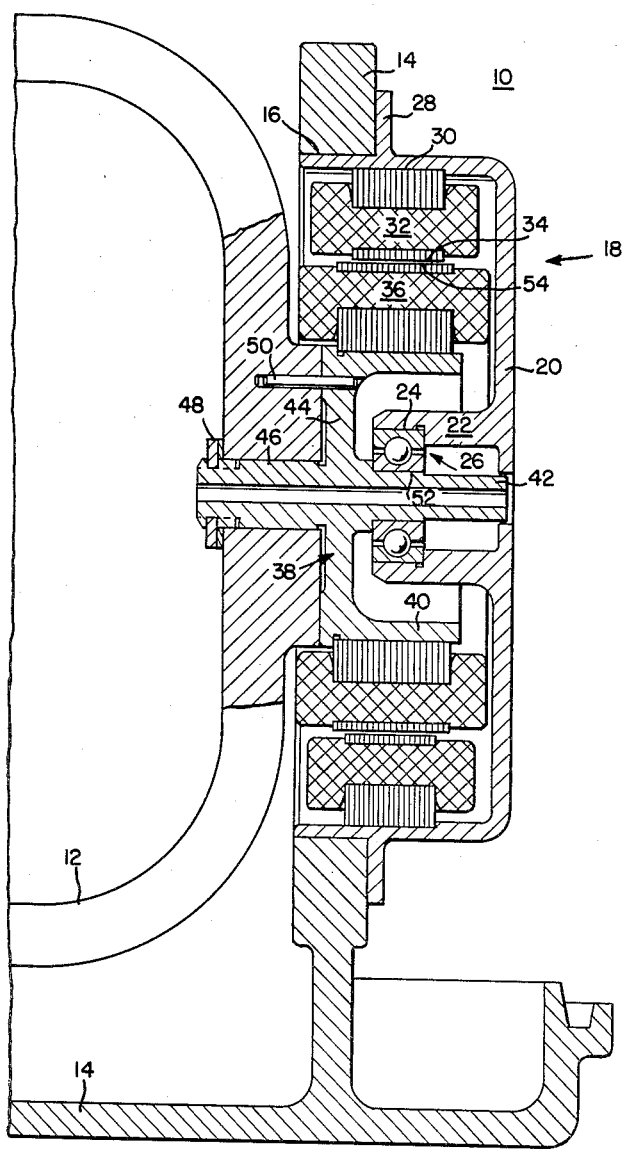
INVENTOR.
HENRY A. DINTER
BY
*George H Fisher*
ATTORNEY United States Patent Office 2,837,924
Patented June 10, 1958

2,837,924

MOUNTING MEANS FOR ANGULAR PICKOFFS

Henry A. Dinter, Minneapolis, Minn., assignor to Minneapolis-Honeywell Regulator Company, Minneapolis, Minn., a corporation of Delaware Application November 8, 1954, Serial No. 467,534

12 Claims. (Cl. 74—5.6)

This invention broadly pertains to an improved means for supporting a first member for rotation on a second member and at the same time providing means for sensing relative rotation between said first and second members. More specifically, this invention pertains to a novel method of mounting an angular pickoff device such as a synchro on a gyroscope where the pickoff device is a pre-assembled unit having first and second portions positioned together by bearing means that allows relative rotation therebetween, the first member of the synchro being attached to a gimbal frame or equivalent of a gyroscope and the second member of the synchro being secured to the base or equivalent member of the gyroscope. Thus the novel pickoff structure effectively provides a rotatable connection between the gimbal frame and the base while at the same time senses relative rotation therebetween.

In prior art pickoff devices used on gyroscopes, the gimbal bearing at the pickoff end of the gimbal frame is a part of both the gimbal and the base structure. To explain, the gimbal is journalled directly on the base structure by having a suitable bearing interposed therebetween. Pickoffs of the selsyn type are manufactured as separate rotors and stators, and are tested as a pair of parts on angular positioning test device designed to simulate the gimbal structure. This preliminary testing is essential in order to check the operativeness and accuracy of the pickoff as an assembly. Then the prior art pickoffs are disassembled and the stator is mounted separately from the rotor—generally in some sort of locating sleeve cut into the base, and the rotor is also mounted separately—generally on a similar locating sleeve attached to the gimbal. The prior art methods suffer from two serious disadvantages. First, where the rotor and the stator are mounted as separate elements, the concentricity between the rotor and the stator when mounted on the gyro cannot be controlled by any amount of care in the initial construction of the pickoff as the lack of concentricity or run-out depends in part upon the tolerances of the gimbal and base structures. Secondly, the test results obtained on the remote angular positioning test device, no matter how perfectly the test device simulates the actual gyro gimbal structure, nor how careful the testing technique may be, are meaningless once the pickoff is disassembled and the rotor is mounted on the gimbal and the stator is mounted on the base since the rotor-stator run-out is certain to differ from what it was on the test device. This is a very serious problem in the prior art devices for very sensitive and accurate applications and especially so where a synchro is used as the pickoff since a slight amount of run-out between the rotor and the stator of a synchro can produce large output errors. My invention overcomes the difficulty of the prior art devices by having a structure with a fixed and minimum runout between the stator and the rotor of the pickoff and by having a structure that does not have to be disassembled for its installation on the gyro. Thus, once the pickoff is assembled, the run-out between the rotor and stator of the pickoff is fixed and it is not changed when the synchro is mounted on the gyro. Thus the preliminary test information obtained with the synchro mounted on the test stand may be relied upon as the final accuracy of the assembled device.

It is therefore an object of the invention to provide an improved pickoff mounting means for gyroscopic devices.

A further object of the invention is to provide with a pair of relatively rotatable members, means for supporting one of the members by the other and for sensing relative rotation between said members.

A further object of the invention is to provide a pickoff device for a gyroscope that may be assembled as a unit prior to the assembly of the gyro and then mounted on the gyro, still as a unit, by being interposed between the base and the gimbal frame of the gyro, the original relationship between the stator and the rotor of the pickoff remaining undisturbed and the pickoff serving as the supporting means between the base and the gimbal frame.

Other and more specific objects of the invention, including constructional details of pickoffs embodying my invention, as well as the method of assembling gyroscopic devices comprising the novel pickoffs will be set forth more fully in and become apparent from a reading of the following specification and appended claims, in conjunction with the accompanying drawing in which the single figure depicts a partial showing of a gyroscopic device comprising in part my improved apparatus.

Numeral 10 designates a gyroscopic device comprising in part a gimbal frame 12 and a base 14. Base 14 has a suitable recess 16, preferably circular in configuration, in which is disposed the outer housing 20 of a pickoff of the synchro type, the pickoff being generally identified by reference numeral 18. Housing 20 has an inwardly extending central hub portion 22 having a suitable central recess 24 therein into which is pressed the outer race of a suitable ball bearing 26. Housing 20 has a circumferential flange 28 which assists in positioning housing 20 with respect to base member 14. The inner surface of the outer portion of housing 20 is recessed as at 30 and serves to position a stator member 32 of the synchro pickoff. In practice, the inside diameter 34 of the stator 32 will be machined at the same time that recess 24 in hub 22 of housing 20 is machined, the stator 32 being pressed into housing 20 prior to the machining operation. This insures that there will be perfect concentricity between the inside diameter 34 of stator 32 and the recess 24 in which is disposed the bearing 26.

A rotor 36 of the synchro pickoff 18 is adapted to be mounted on a rotor mounting sleeve generally identified by reference numeral 38. To this end is provided a drum portion 40 of sleeve 38 over which is pressed rotor 36. Rotor mounting sleeve 38 has a hollow shaft portion 42 extending in both directions from a web portion 44 which connects drum portion 40 with the shaft 42. The lefthand portion of shaft 42 as viewed in the drawing is adapted to pass through a suitable aperture 46 in gimbal 12. The rotor mounting sleeve 38 and gimbal 12 are held in assembled relationship by a suitable nut member 48 cooperating with suitable threads on the lefthand extremity of shaft 42 as shown in the drawing. A pin member 50 extending through suitable recesses in gimbal 12 and rotor mounting sleeve 38 further serves to position said gimbal and said sleeve with respect to one another.

The right hand portion of shaft 42 as viewed in the drawing has a machined surface 52 of a suitable diameter to fit within the inner race of the bearing 26. In the manufacture of the pickoff, the rotor 36 is pressed on to drum portion 40 of rotor mounting sleeve 38 and then the outside diameter 54 of the rotor 36 is ground at the same time that surface 52 is ground thus insuring concentricity between the outside diameter 54 of the rotor 36 and the bearing 26. The pickoff is assembled by first pressing synchro stator 32 into housing 20 and by pressing rotor 36 of synchro 18 onto the rotor mounting sleeve 38. The inside diameter 34 of stator 32 and recess 24 on hub 22 are machined while the outer housing 20 is on the same fixture thus maintaining concentricity therebetween and the outside diameter 54 of rotor 36 and surface 52 on shaft 42 are machined while rotor mounting sleeve 38 is on the same fixture thus maintaining concentricity therebetween also. It follows therefore that when the rotor assembly and the stator assembly are fitted together with bearing 26, that a maximum amount of concentricity is preserved, the run-out between the rotor and stator depending only upon the two ground diameters in each housing plus any run-out in the bearing itself.

Once assembled, the pickoff 18 can be tested and then mounted as a unit to the gyro structure, the peripheral surface of outer housing 20 fitting into recess 16 of base member 14 and the lefthand portion of shaft 42 as shown, extending through aperture 46 of gimbal 12. The base 14, pickoff 18 and gimbal 12 are held in assembled relationship by nut 48 and by a suitable arrangement on the other end of the gimbal 12, not shown, which allows relative rotation but prevents relative longitudinal movement between gimbal 12 and base 14.

While I have shown and described a specific embodiment of this invention, further modifications and improvements will occur to those skilled in the art. I desire to be understood, therefore, that this invention is not limited to the particular form shown and I intend in the appended claims to cover all modifications which do not depart from the spirit and the scope of this invention.

What I claim is:

1. In a gyroscopic device having a gimbal frame and a base, a pre-assembled synchro pickoff journalling said frame on said base, said pickoff comprising a rotor member rotatably supported on a stator member, said rotor being connected to said frame and said stator being connected to said base.

2. In a gyroscopic device having a gimbal member and a gimbal supporting member, a permanently assembled electrical pickoff having a first part and a second part mounted for rotation on said first part, said pickoff being interposed as a unit between said members with said first part being connected to one of said members and said second part being connected to said other member so as to provide a rotatable connection between said members and so as to sense relative rotation between said members.

3. In a gyroscopic device having a gimbal member and a gimbal supporting member, a permanently assembled electrical pickoff having a first part and a second part mounted for movement on said first part said pickoff being interposed as a unit between said members with said first part being connected to one of said members and said second part being connected to said other member so as to provide a movable connection between said members and so as to sense relative movement between said members.

4. In a gyroscopic device having a first member and a second member, a pre-assembled synchro pickoff comprising a stator, a rotor, and bearing means within the confines of said rotor for rotatably connecting said stator and said rotor, said pickoff being assembled as a pre-assembled unit with said first and second members, said rotor being connected to said first member, said stator being connected to said second member, and said pickoff bearing means providing a rotational connection between said members.

5. In a gyroscopic device having a first member and a second member, a pre-assembled synchro pickoff comprising a stator, a rotor, and bearing means within the confines of said rotor and stator for rotatably connecting said stator and said rotor, said pickoff being assembled as a pre-assembled unit with said first and second members, said rotor being connected to said first member, said stator being connected to said second member, and said pickoff providing a rotational connection between said members.

6. In a gyroscopic device having a first member and a second member, a pre-assembled synchro pickoff comprising a stator, a rotor, and bearing means within the confines of said pickoff for rotatably connecting said stator and said rotor, said pickoff being assembled as a pre-assembled unit with said first and second members, said rotor being connected to said first member, said stator being connected to said second member, and said pickoff providing a rotational connection between said first and second members.

7. In a gyroscopic device having a gimbal frame and a base, a pre-assembled synchro comprising a stator member, a rotor member and bearing means for rotatably mounting said rotor on said stator, said synchro being secured to said frame and said base as a pre-assembled unit and serving as a means of rotatably supporting said frame on said base and for sensing relative rotation between said frame and said base.

8. In a gyroscopic apparatus, a base member, a gimbal member adapted to be movably mounted on said base member, a signal generating means comprising a plurality of parts connected together in a manner permitting relative movement and capable of generating a signal as a result of said movement, and means mechanically connecting said signal generating means to said base member and said gimbal member so that said signal generating means serves as the means for mounting said gimbal member on said base member and for permitting said gimbal member to move relative to said base member.

9. In a gyroscopic device having a gimbal member and a gimbal supporting member, a pre-assembled electrical angular pickoff device adapted to be assembled as a unit and mounted as a unit on said gyroscopic device between said members so that said pickoff device supports said gimbal member for rotation relative to the other of said members, said pickoff device also serving to sense relative rotation between said members.

10. In gyroscopic apparatus having a first member and a second member, a pre-assembled inductive device comprising a stator, a rotor, and bearing means within the confines of said device for rotatably connecting said stator and rotor, said device being assembled as a pre-assembled unit with said first and said second members, said rotor being connected to said first member, said stator being connected to said second member, and said device providing a rotational connection between said first and second members.

11. Apparatus of the class described comprising a first member and a second member, a pre-assembled inductive device comprising a stator, a rotor, and bearing means within the confines of said device for rotatably connecting said stator and rotor, said device being assembled as a pre-assembled unit with said first and said second members, said rotor being connected to said first member, said stator being connected to said second member, and said device providing a rotational connection between said first and second members.

12. Apparatus of the class described comprising a first member and a second member, a pre-assembled control device comprising a stator, a rotor, and bearing means within the confines of said device for rotatably connecting said stator and rotor, said device being assembled as a pre-assembled unit with said first and said second members, said rotor being connected to said first member, said stator being connected to said second member, and said device providing a rotational connection between said first and second members.

References Cited in the file of this patent

UNITED STATES PATENTS

| 2,195,351 | Ziebolz | Mar. 26, 1940 |
| 2,389,158 | Lane | Nov. 20, 1945 |
| 2,603,094 | Wrigley | July 15, 1952 |
| 2,645,942 | Hurlburt | July 21, 1953 |

FOREIGN PATENTS

| 531,870 | Great Britain | Jan. 13, 1941 |